United States Patent
Reinholz

[19]

[11] Patent Number: 5,855,398
[45] Date of Patent: Jan. 5, 1999

[54] METHOD AND ASSEMBLY FOR CONNECTING A FUEL OR FLUID LINE

[75] Inventor: Antonio Carlos Reinholz, Valinhos, Brazil

[73] Assignee: Tampas Click Para Veiculos Industria E Comercio Ltda., Estado de Sao Paulo, Brazil

[21] Appl. No.: 839,827

[22] Filed: Apr. 14, 1997

[30] Foreign Application Priority Data

Apr. 12, 1996 [BR] Brazil ................................. 9601539-0

[51] Int. Cl.6 ................................................. F16L 35/00
[52] U.S. Cl. ................................. 285/93; 29/525; 285/3; 285/921
[58] Field of Search ............................ 285/3, 4, 93, 305, 285/317, 921; 137/797; 29/525, 890.14, 890.144, 407.01; 264/138

[56] References Cited

U.S. PATENT DOCUMENTS

| | | | |
|---|---|---|---|
| 4,707,000 | 11/1987 | Torgardh | 285/305 |
| 4,915,420 | 4/1990 | Washizu | 285/93 X |
| 4,946,205 | 8/1990 | Washizu | 285/93 X |
| 5,425,556 | 6/1995 | Szabo | 285/93 X |
| 5,730,481 | 3/1998 | Szabo et al. | 285/305 |

*Primary Examiner*—Eric K. Nicholson
*Assistant Examiner*—Greg Binda
*Attorney, Agent, or Firm*—Steinberg & Raskin, P.C.

[57] ABSTRACT

An assembly for connecting a fuel or fluid line between a male part and a female part in which a laminar block axially locks the male part and the female part in connection with one another by being displaced about the male part in a direction perpendicular to the axis of the connecting line. The assembly includes a unitary element made of a semi-rigid material and having a substantially semi-circular portion constituting an elastic clamp, projections extending from one side of the clamp, each including a portion facing inwardly toward a central longitudinal axis of the clamp and adapted to engage with the female part, a flap arranged at each end region of the clamp and having a small thickness, and an annular stop releasably coupled to the flaps and including radial blocking elements. The annular stop is adapted to be interposed between the male part and the female part and to be ruptured or separated from the flaps and thus the elastic clamp upon insertion of the male part fully into the female part. On the other hand, the blocking elements are adapted to prevent displacement of the laminar block if the male part is not fully inserted into the female part.

10 Claims, 2 Drawing Sheets

METHOD AND ASSEMBLY FOR CONNECTING A FUEL OR FLUID LINE

FIELD OF THE INVENTION

The present invention relates to an assembly and connection indicator for lines of fuel or fluids in general, and more specifically, to a template piece which assists in and indicates the proper fitting of a male backpiece to connection terminals of fluid conducting hoses.

The present invention also relates to a method for connecting a male part and a female part through which a fluid or fuel line passes.

BACKGROUND OF THE INVENTION

As is well known to those skilled in the art, it is a concern in car assembly plants, and more specifically engine assembly plants, to obtain a perfect tightness during assembly of the fluid pipings and conductors, irrespective of the flammability of the fluid.

As is well known, the assembly of such hoses in their respective connectors is made by fitting axially and under pressure the end of the hose provided with annular radial enlargement, the male backpiece, to the female connection body. The locking with respect to each other is made by a laminar lock which actuates with respect to the male backpiece and the female body, based on movement in a plane perpendicular to the central axis of the coupling members.

The connections used for coupling these hoses may have different shapes, such as elbow, "T"-shaped, "Y"-shaped, depending on the direction of the passing fluid, which may be a flammable fuel, such as gasoline, diesel or alcohol, or may be a lubricating or hydraulic fluid, such as a motor oil, brake fluid or hydraulic steering fluid, or may be even a refrigerating fluid, such as radiator water or solution for sealed radiators.

Although it ensures the axial retention between the parts, a drawback of this conventional method of axial fit and radial locking between the male backpiece and the female body of the vehicle fluid communication line is that it is not possible to find out whether the outermost edge of the male backpiece has reached its end of travel relative to the housing or seat defined within the female body during the axial connection between them. The potentially spaced apart coupling of such pieces may cause leakages to occur which might result in serious problems.

It is obvious that a bad connection of any one of the fluid conduction lines existing in a vehicle may cause serious problems and even accidents due to a mechanical failure of the vehicle caused by fluid leakage.

OBJECTS AND SUMMARY OF THE INVENTION

Accordingly, one of the objects of this invention is to provide an indicator of assembly and connection of fuel or fluid lines in general that enables a visual determination of the proper coupling between the male backpiece and the female body of a tubular connection for fluid passage.

Another object of this invention is to provide an indicator of assembly and connection of fuel and fluid lines in general which does not interfere in the coupling or mechanical locking between the parts axially adaptable and radially lockable with respect to each other by the laminar locking element.

Still another object of this invention is to provide an indicator of assembly and connection of lines of fuel or fluids in general which does not alter the sequence of assembly of fluid line connections and speeds up and ensures the efficiency of quality control operations.

It is another object of the invention to provide a new and improved method for connecting male and female parts through which a fuel or fluid lines passes.

These and other objects and advantages of this invention are attained with an indicator of assembly and connection of lines of fuel or fluids in general which comprises a one-piece, unitary element made of a semi-rigid material, defining a elastic clamp substantially semi-annular and provided with three "L" shaped orthogonal projections facing downwards and with its horizontal portion facing the central longitudinal axis of this clamp. One of the three projections is arranged centrally in the arched portion of this elastic clamp and the other two projections are arranged centrally in the respective "U" shaped recesses, as defined in the extreme portions of this clamp. In the free end of each "U" shaped recess, there is provided a corresponding inverted "L" shaped flap having a small thickness, which actuates as an anchoring site with a weakening line for an annular stop axially prone to rupture or separate from connection with the flaps and which is provided with radial elements for blocking the laminar lock used to block axially the male and female parts of the fluid connection.

In one embodiment of the assembly for connecting a fuel or fluid line between a male part and a female part, a laminar block axially locks the male part and the female part in connection with one another by being displaced about the male part in a direction perpendicular to the axis of the connecting line. In accordance with the invention, the assembly includes a unitary element made of a semi-rigid material and having a substantially semi-circular portion constituting an elastic clamp, a plurality of projections extending from one side of the clamp, each including a portion facing inwardly toward a central longitudinal axis of the clamp and adapted to engage with the female part, a flap arranged at each end region of the clamp and having a small thickness, and a rupturable annular stop coupled to the flaps and including radial blocking elements. The annular stop is adapted to be interposed between the male part and the female part and to be ruptured, i.e., separated from its coupling to the flaps of the elastic clamp and thus the elastic clamp, upon insertion of the male part fully into the female part. On the other hand, the blocking elements associated with the annular stop are adapted to prevent displacement of the laminar block if the male part is not fully inserted into the female part.

In certain embodiments, the clamp has an intermediate portion having a semi-circular arc shape and the end regions are arranged at ends of the intermediate portion and comprise a "U" shaped recess. The projections may constitute three "L" shaped projections, a middle one of which is arranged in a middle region of the intermediate portion, and lateral ones of which are arranged on a respective one of the "U" shaped recesses. The flaps may have an inverted "L" shape whereby the blocking elements are interposed between the annular stop and the flaps for connecting the annular stop to the flaps. The female part ideally includes a receiving nozzle so that the annular stop is adapted to be retained within the receiving nozzle of the female part.

In a basic embodiment of the method for connecting a male part to a female part in accordance with the invention, the unitary element essentially as described above is arranged on the female part, the male part is inserted through the annular stop into the female part until the annular stop separates from the flaps, the male part having a radial enlargement engaging with the annular stop, and then a laminar block is displaced into connection with the male part to force the projections out of engagement with the female part. The annular stop may be retained within a receiving nozzle of the female part upon separation of the annular stop from the flaps. Blocking elements are arranged between the flaps and the annular stop to prevent displacement of the laminar block if the male part is not inserted fully into the female part.

BRIEF DESCRIPTION OF THE DRAWINGS

Additional objects of the invention will be apparent from the following description of the preferred embodiment thereof taken in conjunction with the accompanying non-limiting drawings, in which.

DETAILED DESCRIPTION OF THE PREFERRED EMBODIMENTS

Figure 1:
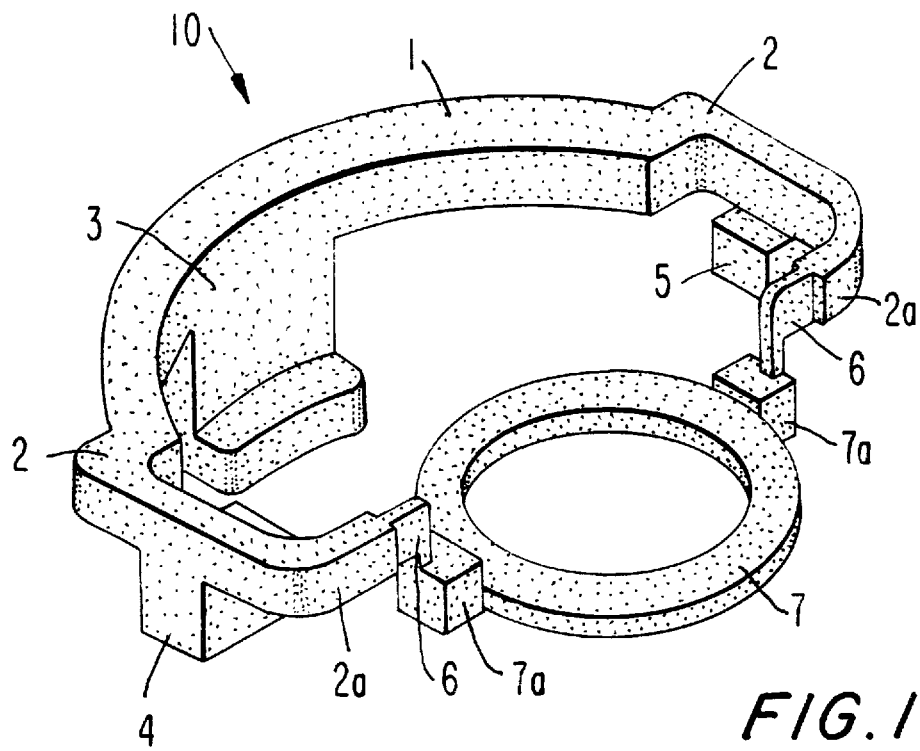
FIG. 1 is a perspective view of the indicator of assembly and connection of the lines of fuel or fluids in general.

Referring to FIGS. 1–5 wherein like reference numerals refer to the same or similar elements, an indicator of assembly and connection of the lines of fuel and fluids in accordance with the invention comprises a one-piece, unitary element made of semi-rigid material, such as for example plastic or a material of similar mechanical strength, and defines a elastic clamp 10 with an intermediate portion 1 in the shape of a semi-annular arc and end portions 2 arranged at each end region of the clamp 10. Each end portion 2 is in the form of a "U" shaped recess, one leg of which is attached to the intermediate portion 1 and the other leg of which constitutes a free end 2a.

The elastic clamp 10 includes a plurality of projections on one side thereof, e.g., three "L" shaped projections 3, 4 and 5 extending perpendicularly from the bottom side of the elastic clamp 10. Each projection 3,4,5 has a horizontal portion at a bottom region thereof (at the side which is not adjacent to the bottom side of the clamp 10), which is directed inward toward a central longitudinal axis of the elastic clamp 10. In other words, the horizontal portion is at a lowermost portion of the projections 3,4,5, considering the top to be the location at which the projections 3,4,5 are mounted to the elastic clamp 10.

One of the projections, namely the centrally arranged projection 3, is positioned relative to the bottom face of the elastic clamp 10 and arranged in the middle region of the arced intermediate portion 1 of the elastic clamp 10, while the other two projections, so-called extreme projections 4 and 5, are also positioned relative to the bottom face of the elastic clamp 10 and respectively arranged in the center of the "U" shaped recesses 2 defined in the end portions of the clamp 10.

Figure 2:
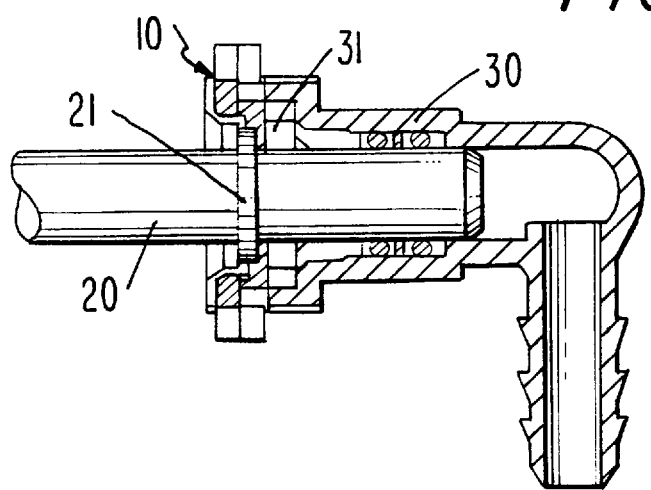
FIG. 2 is a longitudinal sectional view of the connection between the male backpiece and the female body in the beginning of the axial coupling which is provided with the assembly indicator.
Figure 3:
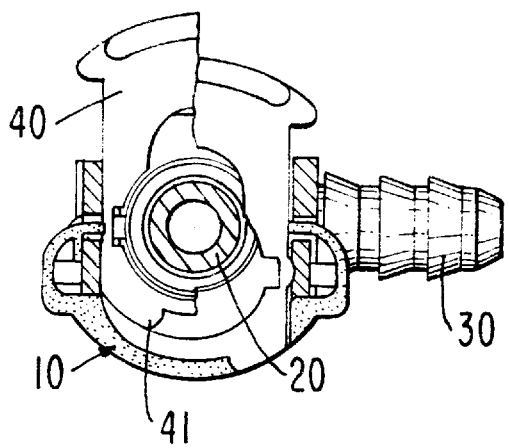
FIG. 3 is a cross sectional view of the connection between one male backpiece and the female body axially coupled with respect to each other and provided with the assembly and connection indicator rotated 90° from the plane.

As shown in FIG. 1, in the free end 2a of each "U" shaped recess 2, there is incorporated a corresponding flap 6 having a small thickness and in the shape of an inverted "L", so that the pair of flaps 6 actuate as anchoring sites provided with a weakening line for an annular stop 7 axially prone to rupture, i.e., separate physically from the connection with the flaps 6 and thus with the elastic clamp 10. The stop 7 is annular and connected to the flaps 6 by means of blocking radial elements 7a having a cubic shape, and which serve as blocking elements for a laminar block 40 which usually is displaced transversely relative to the axis of coupling between a male part 20 and a female part 30 to axially block them (FIG. 2).

As shown in FIGS. 2–5, the indicator of assembly and connection of lines of fuel or fluid in accordance with the invention is placed near the nozzle which receives the female body 30 from the connector, so that the annular stop 7 and blocking elements 7a are maintained within such nozzle while the remaining portion of the elastic clamp 10, i.e., the intermediate portions 1 and extreme portions 2, with its retaining projections 3, 4 and 5 actuate on external points of radial resilient retention around the female body 30 of the connector.

Figure 4:
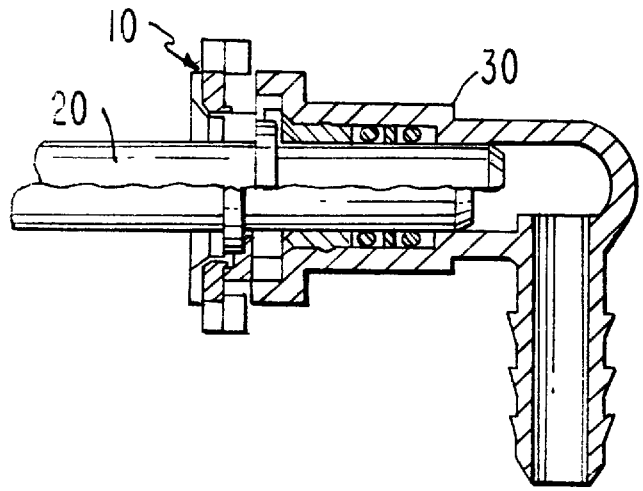
FIG. 4 is a longitudinal sectional view of the connection between one male backpiece and the female body wherein the male backpiece is at the beginning (bottom portion) and end (top portion) of axial coupling with the female body and the respective effect caused by the backpiece in the assembly and connection indicator.
Figure 5:
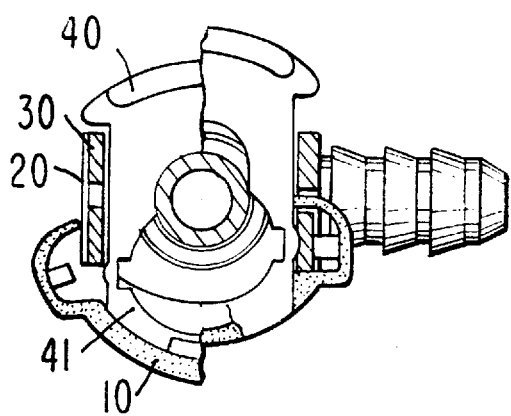
FIG. 5 is a cross sectional view of the connection between one male backpiece and a female body axially coupled with respect to each other and provided with the assembly and connection indicator rotated 90° from plane assembly and connection, showing the visual effect caused in the indicator of when the connection laminar lock is in the beginning (right side) and end (left side) of travel.

Following this preliminary assembly of the clamp 10 near the female body 30 of the connector of fluid lines, the assembly of the connection is started, by introducing axially the male backpiece 20 into the female body 30, by forcing the male backpiece against the female body, so that a radial enlargement 21 existing in the male backpiece 20 pushes forward and ruptures the annular stop 7 and blocking elements 7a, i.e., separates the annular stop 7 and blocking elements 7a from connection with the flaps 6. The annular stop 7 is then maintained in a seat 31 within the female body 30 between the radial enlargement 21 of the male backpiece 20 and the female body 30, as illustrated in FIGS. 2 and 4.

After the full axial coupling when the male backpiece 20 is inserted fully into the female body 30, ensured by the rupture of the annular stop 7, 7a, the laminar block 40 is installed in connection with the male backpiece 20. The laminar block 40 is displaced transversely relative to the male pieces 20 and female body 30 in a plane which is common to that in which the elastic clamp is contained 20 (both being substantially perpendicular to the central axis of the flow line being connected by the male and female parts), so that a front edge 41 of this laminar block 40 pushes the clamp 10 backward causing a resilient deformation of its retaining projections 3, 4 and 5 to occur, and consequently the release of the clamp 10 of the male and female connection of the line of fuel and fluids in general, which ensures and informs that the coupling was made properly.

If the male backpiece 20 is not axially inserted up to the complete end of its possible path, rupture of the annular stop 7 and blocking elements 7a from the flaps 6 will not occur, which by its turn will then maintain the blocking radial elements 7a with a cubic shape, arranged in such a plane that would prevent the transverse insertion of the laminar block or lock 40 which will reveal that the coupling has not been fully made.

In summary, a quick and reliable manner to ensure that a male piece is completely inserted into a female piece without a space remaining between the pieces is enabled by the advantageous use of the elastic clamp in accordance with the invention, alone as well as in conjunction with a laminar block if used.

The examples provided above are not meant to be exclusive. Many other variations of the present invention would be obvious to those skilled in the art, and are contemplated to be within the scope of the appended claims.

I claim:

1. In an assembly for connecting a fuel or fluid line between a male part and a female part in which a laminar block axially locks the male part and the female part in connection with one another, the improvement comprising a unitary element made of a semi-rigid material, said element having a substantially semi-circular portion constituting an elastic clamp, said clamp having a central longitudinal axis and end regions, a plurality of projections extending from one side of said clamp, each of said projections including a portion facing inwardly toward the central longitudinal axis of said clamp and being adapted to engage with the female part, a flap arranged at each of said end regions of said clamp and having a small thickness, and an annular stop disposed between said flaps and including radial blocking elements, said annular stop being adapted to be interposed between the male part and the female part and to be separated from said flaps upon insertion of the male part fully into the female part, and said blocking elements being adapted to prevent displacement of the laminar block if the male part is not fully inserted into the female part.

2. The assembly of claim 1, wherein said clamp has an intermediate portion having a semi-circular arc shape and said end regions are arranged at ends of said intermediate portion and comprise two "U" shaped recesses, said projections comprising three "L" shaped projections.

3. The assembly of claim 2, wherein a middle one of said three projections is arranged in a middle region of said intermediate portion, lateral ones of said three projections being arranged on a respective one of said "U" shaped recesses.

4. The assembly of claim 1, wherein said flaps have an inverted "L" shape, said blocking elements being interposed between said annular stop and said flaps for connecting said annular stop to said flaps.

5. The assembly of claim 1, wherein the female part includes a receiving nozzle, said annular stop being adapted to be retained within the receiving nozzle of the female part.

6. The assembly of claim 1, wherein said projections are structured and arranged to extend around the female part.

7. A method for connecting a male part to a female part through which a fuel or fluid line passes, comprising the steps of:

placing a unitary element made of a semi-rigid material on the female part, said element having a substantially semi-circular portion constituting an elastic clamp, said clamp having a central longitudinal axis and end regions, a plurality of projections extending from one side of said clamp, each of said projections including a portion facing inwardly toward the central longitudinal axis of said clamp and engaging with the female part, a flap arranged at each of said end regions of said clamp and having a small thickness, and an annular stop releasably coupled to said flaps, inserting the male part through said annular stop into the female part until said annular stop separates from said flaps, the male part having a radial enlargement engaging with said annular stop, and then displacing a laminar block into connection with the male part to force said projections out of engagement with the female part.

8. The method of claim 7, further comprising the step of retaining said annular stop in a receiving nozzle of the female part upon separation of said annular stop from said flaps.

9. The method of claim 7, further comprising the step of arranging blocking elements between said flaps and said annular stop to prevent displacement of the laminar block if the male part is not inserted fully into the female part.

10. The method of claim 7, further comprising the step of displacing the laminar block in a direction perpendicular to the axis extending through fluid lines in the male part and the female part.

* * * * *